United States Patent
Troesch et al.

(10) Patent No.: US 10,526,222 B2
(45) Date of Patent: Jan. 7, 2020

(54) WASTEWATER PURIFICATION DEVICE AND UTILIZATIONS

(71) Applicants: SYNTEA, Le Pian-sur-Garonne (FR); NATURALLY WALLACE CONSULTING LLC, Raleigh, NC (US); RIETLAND BVBA, Minderhout (BE)

(72) Inventors: Stephane Troesch, Avignon (FR); Esser Dirk, La Chapelle du Mont du Chat (FR); Scott Wallace, Raleigh, NC (US); Dion Van Oirschot, Minderhout (BE)

(73) Assignees: SYNTEA, Le Pian-sur-Garonne (FR); NATURALLY WALLACE CONSULTING LLC, Raleigh, NC (US); RIETLAND BVBA, Minderhout (BE)

( * ) Notice: Subject to any disclaimer, the term of this patent is extended or adjusted under 35 U.S.C. 154(b) by 0 days.

(21) Appl. No.: 15/568,880

(22) PCT Filed: Apr. 22, 2016

(86) PCT No.: PCT/FR2016/050945
§ 371 (c)(1),
(2) Date: Oct. 24, 2017

(87) PCT Pub. No.: WO2016/170279
PCT Pub. Date: Oct. 27, 2016

(65) Prior Publication Data
US 2018/0105445 A1    Apr. 19, 2018

(30) Foreign Application Priority Data
Apr. 24, 2015   (FR) ..................... 15 53702

(51) Int. Cl.
*C02F 3/04*   (2006.01)
*C02F 3/20*   (2006.01)
(Continued)

(52) U.S. Cl.
CPC ............... *C02F 3/04* (2013.01); *C02F 3/201* (2013.01); *C02F 3/301* (2013.01);
(Continued)

(58) Field of Classification Search
CPC .. C02F 3/327; C02F 3/04; C02F 3/046; C02F 3/06; C02F 2103/001; C02F 3/306; C02F 3/301
(Continued)

(56) References Cited

U.S. PATENT DOCUMENTS

| 6,126,827 | A   |   | 10/2000 | Johnson, Jr. et al. |
| 6,406,627 | B1  | * | 6/2002  | Wallace ............. C02F 3/00 210/602 |

(Continued)

FOREIGN PATENT DOCUMENTS

| DE | 41 19 835  | 12/1992 |
| DE | 202 21 682 | 2/2007  |

(Continued)

OTHER PUBLICATIONS

Written Opinion in International Application No. PCT/FR2016/050945, dated Jul. 15, 2016, pp. 1-6.
(Continued)

*Primary Examiner* — Claire A Norris
(74) *Attorney, Agent, or Firm* — Saliwanchik, Lloyd & Eisenschenk

(57) ABSTRACT

The invention relates to a solid filtering wastewater treatment device (100) comprising a first stage (101) with a freely drained fixed culture arranged directly above a second fixed water saturated culture stage (105), and a force aera-
(Continued)

Figure 1:
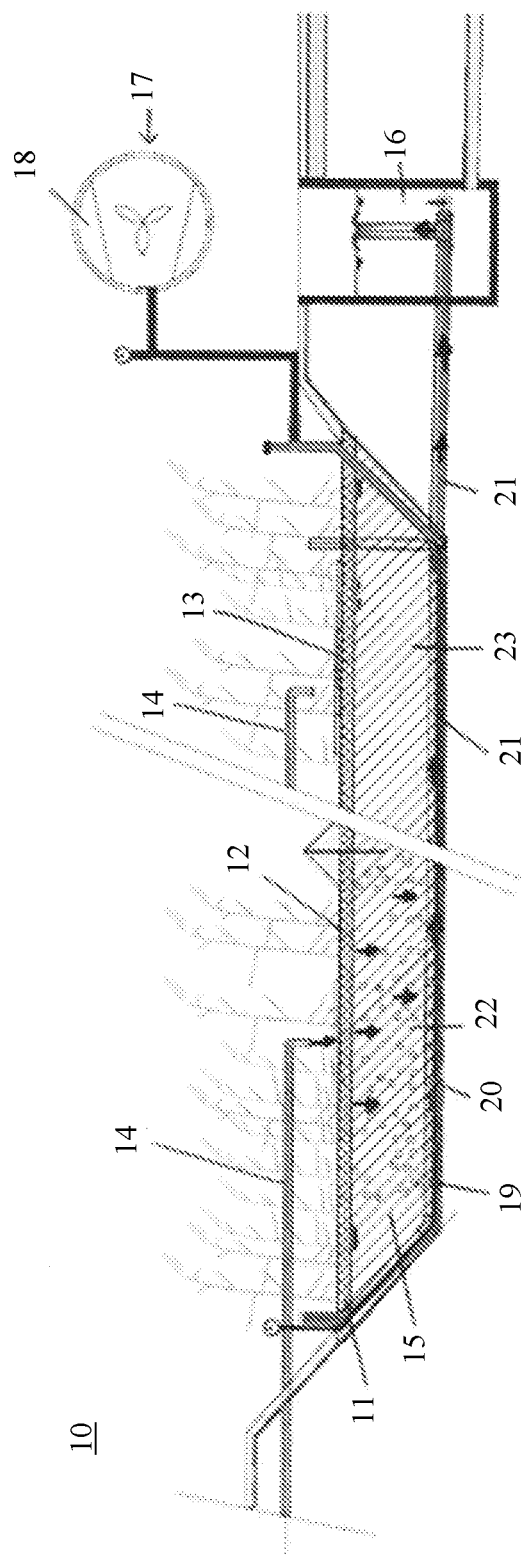

tion system (110) extending under the second stage. The invention also relates to a wastewater treatment method, as well as a process for sludge mineralization, implementing such a purification device.

27 Claims, 3 Drawing Sheets

(51) Int. Cl.
*C02F 3/30* (2006.01)
*C02F 103/00* (2006.01)

(52) U.S. Cl.
CPC .. *C02F 2103/001* (2013.01); *C02F 2209/001* (2013.01); *C02F 2209/225* (2013.01); *C02F 2209/42* (2013.01); *Y02W 10/15* (2015.05)

(58) Field of Classification Search
USPC .................................. 210/602, 620, 170.08
See application file for complete search history.

(56) References Cited

U.S. PATENT DOCUMENTS

| 8,696,907 | B2 | 4/2014 | Rausch et al. |
| 2008/0197073 | A1* | 8/2008 | Jacquet .................. B01D 53/85 |
| | | | 210/602 |
| 2011/0272349 | A1 | 11/2011 | Rausch et al. |

FOREIGN PATENT DOCUMENTS

| EP | 2 213 629 | 8/2010 |
| ES | 2 370 878 | 12/2011 |
| FR | 2 833 254 | 6/2003 |
| FR | 2 913 418 | 9/2008 |

OTHER PUBLICATIONS

Submission of a Third Party in corresponding European Application No. 16723429.3, Nov. 14, 2019, pp. 1-3.

* cited by examiner

WASTEWATER PURIFICATION DEVICE AND UTILIZATIONS

CROSS-REFERANCE TO RELATED APPLICATION

This application is the U.S. national stage application of International Patent Application No. PCT/FR2016/050945, filed Apr. 22, 2016.

The field of the present invention is that of wastewater treatment, particularly small and medium communities. More particularly, the invention relates to a sewage treatment device promoting the mineralization of the sludge accumulating on the surface of said device and/or the reduction of dissolved pollution and more particularly the treatment of nitrogen by nitrification and/or nitrification-denitrification. The invention also relates to purification methods using such a device, and in particular to a method of sludge mineralization.

In general terms, wastewater treatment refers to all techniques to collect, evacuate and treat wastewater to reduce pollution to an acceptable level in the receiving environment. Several pollutants are generally targeted, including suspended solids, which are mainly responsible for the cloudiness or turbidity of wastewater; oxidizable materials, in particular oxidizable organic materials, which consume dissolved oxygen in water and may cause asphyxiation of living organisms; the responsible nitrogen compounds, together with phosphorus materials, for the eutrophication of water bodies. Also, wastewater treatment requires a series of successive steps, each of which is primarily aimed at a particular type of pollutant.

For this purpose, the majority of the devices for treating wastewater by reed-bed filters currently used consist essentially of two separate filters operating in series and fed with sequential batches, constituting respectively a first and a second treatment stage. The first stage of treatment mainly serves to retain the decantable fraction of the pollution, the suspended matter of organic and mineral nature, on the surface of the filter. The second stage of treatment is more specifically aimed at reducing dissolved or colloidal pollution. The second stage is mainly used to degrade the dissolved organic and ammonia pollution, on the one hand in form of oxidized fractions resulting via bacterial metabolism under aerobic conditions to the production of $CO_2$ and $H_2O$ (organic matter) and nitrates, and on the other hand, in a fraction comprising new bacterial cells, usually called sewage sludge. A third treatment stage may, in some cases, be implemented to remove nitrates, before the discharge of treated effluents into the environment. The removal of the total nitrogen is generally carried out by nitrification-denitrification steps in which the organic nitrogen present in the wastewater is converted into ammoniacal nitrogen ($NH4+$) and then into nitrates, nitrates and nitrogen gas ($N2$) during a succession of steps characterized by different oxygen availability conditions. The nitrification step, in aerobic medium, consists of the oxidation of ammoniacal nitrogen to nitrite $NO2$—and then to nitrate $NO3$—, under the influence of nitrous and nitric bacteria. The denitrification step, under the action of heterotrophic denitrifying bacteria in anoxic environment, reduces the nitrates to nitrogen gas $N2$, which then escapes into the atmosphere. Most often, due to the different environmental conditions required for their smooth operation, the nitrification and denitrification steps are carried out in separate installations.

The multiplication of wastewater treatment steps required to achieve the level of pollution required by environmental standards leads to a multiplication of treatment steps, especially if the treatment of global nitrogen is targeted. This results in an increase in the surface area dedicated to water treatment, which impacts the installation cost and, to a lesser extent, the cost of wastewater treatment plants management. In addition, depending on the nature of the terrain (presence of significant elevations, coastal areas, etc.) such facilities may be difficult to be implemented.

It is therefore increasingly necessary to be able to reduce the surface area of wastewater treatment plants without affecting the final level of depollution.

While working on the congestion problems of sewage treatment plants for the communities, the inventors have discovered that it is possible to accelerate the mineralization of the sludge accumulating at the surface of the first treatment stage, receiving raw sewage, by increasing the oxygen supply by means of a forced aeration system. Furthermore, they have succeeded in considerably reducing the overall size of the wastewater treatment device by placing the second treatment stage directly below the first treatment stage. In doing so, the inventors have developed a device where in the forced aeration system disposed at the bottom of said device provides oxygen to the two superimposed treatment stages. In the device according to the invention, the supply of oxygen at the level of the second stage or lower stage makes it possible to ensure the necessary and sufficient oxygenation conditions for a thorough treatment of the dissolved pollution as well as complete nitrification or almost complete nitrogen; while the oxygen rising to the surface favors the mineralization of the sludge which accumulates on the surface of the planted filter. Furthermore, it is possible to adapt the configuration of the treatment device according to the invention, so as to alternate the aerobic and anoxic phases in the filter(s) of the second stage and thus allow nitrates denitrification. Advantageously, the denitrifying bacterial populations are of the optional type, that means, is capable of passing from one respiration to another, in order to be capable, when the $O2$ is insufficient, it will use the oxygen of the nitrates ($NO3$). Nitrifying bacteria are not affected by anoxic conditions. Thus, the nitrifying and denitrifying bacteria can be maintained within the second stage, whatever the conditions (aerobic, anoxic) within said second stage. The wastewater treatment device according to the invention therefore makes it possible, within a single structure, to implement all the processing steps, which normally take place in different structures. The inventors have also pointed out that the use of a forced aeration system in a wastewater treatment device comprising a horizontal flow stage contributes to the at least partial elimination of the pathogenic germs potentially present in the effluent treatment. This stage of elimination of pathogenic germs is particularly advantageous in the context of the treatment of wastewater with the device according to the invention, since the presence of the second stage at which the flow is at least partially horizontal combined with forced aeration promotes the elimination of these pathogens.

The subject of the invention is thus a device for purifying wastewater of the filtering mass type comprising a first stage with a free-drained fixed culture, disposed directly above a second culture-fixed stage on a fine to coarse support that are saturated in water, and a forced aeration system extending below the second stage.

The invention also relates to a wastewater treatment process using the wastewater treatment device of the invention, according to which the first stage is supplied with raw effluent, said process comprising:

a phase (A) of mineralization of the sludge accumulating on the surface of the first stage;

a phase (B) of aerobic and possibly anoxic degradation of the dissolved pollution at the second stage;

a phase (C) of treated water discharge.

Of course, it is possible to obtain a start of aerobic degradation of the pollution dissolved at the level of the fixed culture of the first stage. However, the degradation, and especially nitrification, occurs mostly at the level of the second stage.

The device according to the invention is particularly suitable for the treatment of wastewater from small and medium-sized agglomerations, that is to say communities of less than 10,000 population equivalents (PE), and most often from 50 to 2000 PE. Of course, the device according to the invention can also be used for the treatment of wastewater from larger agglomerations, as well as the treatment of industrial wastewater, rainwater, agri-food effluents, etc.

According to the invention, the device comprises successively, in the height, a planted and freely drained first stage, a second stage saturated with water and a bottom receiving the forced aeration system. In the context of the invention, the thickness, or height, is the dimension extending substantially vertically with respect to a surface on which the device rests. Thus, when the device is supplied with effluent, the water percolates through the first stage, then reaches the second stage, or lower stage, before being discharged from the bottom out of the device.

The forced ventilation system is able to inject air from the bottom of the device, so that the oxygen passes through the second stage before reaching the first stage and then the free air. In a particular implementation, the aeration system makes it possible to inject between 100 and 300 g $O_2/m^2$/day. In general, the skilled person knows how to adapt the flow rate to the desired performances.

The first stage, or upper stage, consists of at least one planted filter, preferably macrophytes, and more preferably reeds, advantageously comprising fine supports. The first stage may advantageously comprise two or more filters in parallel, which can, in a conventional manner, be fed alternately.

In a particular implementation, the first stage has a thickness, or height, preferably between 10 and 50 cm. Conventionally, the first stage may comprise a layer of particulate filtering material, such as gravel with a particle size of between 2 and 8 mm, or between 2 and 4 mm, a layer of pozzolan with a grain size of between 2 and 8 mm, or any other suitable mounting bracket. The choice of the particulate material is within the scope of those skilled man.

In general, the first stage of the device according to the invention is suitable for receiving crude effluent, preferably scanned raw effluent, is simply free of macro-waste.

According to the invention, the first stage is freely drained, so that at the arrival of effluent feeding, the water is distributed on the surface of the filter supplied, then vertically percolates uniformly in the direction of the background. Sludge accumulates on the filter surface. The oxygen supply from the bottom of the device through the forced aeration system optimizes the mineralization of sludge, $CO_2$, $H_2O$, salt, etc. The device according to the invention thus makes it possible to reduce or even eliminate the risk of clogging. It is thus possible, according to the invention, to apply larger loads than in a conventional first stage, and/or to increase the supply phase of a filter. For example, whereas a conventional first stage is generally dimensioned at 300 g $COD/m^2$/day with respect to the surface of the filter in operation, it is possible with the device according to the invention to increase the surface charge applied to the first stage filter at much higher values, in particular at least 600 g $COD/m^2$/day (COD: chemical oxygen demand).

Water percolating through the first floor to reach the second floor undergoing advantageously a beginning of treatment of dissolved pollutions by the aerobic bacterial biomass fixed on the supports.

The second floor, or lower floor, is arranged directly under the first floor. Otherwise, the fixed culture of the first floor is based on the fixed culture of the second floor.

Advantageously, the second stage has a thickness, or height, between 100 and 200 cm. According to the invention, the second stage may comprise a layer of particulate filtering material, such as gravel or pozzolan, with a particle size of preferably between 8 and 16 mm, or between 10 and 20 mm, or between 20 and 40 mm, or between 30 and 60 mm. The choice of particulate material is within the reach of those skilled man.

The second stage is intended to be saturated with water, so that loading means are provided to ensure level maintenance. In addition, depending on the hydraulic configuration chosen, it is possible to provide a vertical and/or horizontal flow within the second stage. In a particular implementation the second stage comprises two or more filters in parallel, which can operate alternately. Advantageously, according to an example of the invention, when the second stage comprises at least two filters, the water percolating vertically within one of the filters then percolates horizontally within all or part of the adjacent filters. Such a configuration is particularly advantageous since it promotes the elimination of pathogenic germs likely to be present in the effluent to be treated.

According to the invention, the water percolating from the first stage arrives in the second stage. The biological treatment of dissolved pollutants is favored by the supply of oxygen from the bottom of the device. Advantageously, the oxygenation conditions through the forced aeration system are such that it is possible to obtain a significant nitrification or complete nitrogen. By nitrification means the oxidation of ammoniacal nitrogen to nitrite and nitrate is achieved by nitrifying bacteria. For example, the oxygenation in the second stage may be greater than 10 mg $O_2$/L, within the limit of the saturation $O_2$ concentration (depending on the temperature and salinity of the water), but preferably between more than 0 and 5 mg $O_2$/L.

The forced ventilation system is advantageously capable of operating continuously or discontinuously within a filter. It is then possible to alternate the aerobic and anoxic conditions within a given filter. In a particular embodiment, the second stage comprises a single filter fed sequentially by the forced aeration system. Thus, after an aerobic phase in which the nitrogen undergoes nitrification, it is possible to obtain an anoxic phase which is suitable for denitrification. Denitrification refers to the denitrification of nitrates in molecular nitrogen by denitrifying bacteria. Thus, when the forced aeration system operates alternatively or sequentially, so as to alternate the aerobic and anoxic conditions within the second stage, it is possible to obtain a denitrification phase (D) at the second stage in terms anoxic and advantageously non-limiting carbon, before the evacuation phase (C). This results in a treatment of the overall nitrogen within the same filter.

In another embodiment, the second stage comprises at least two filters in parallel. Advantageously, the filters are alternately supplied with oxygen by the forced aeration system. When a filter of the second stage is supplied with oxygen by the forced aeration system, another filter of the second stage is not fed so as to create anoxic conditions, and vice versa. It is thus possible to obtain a denitrification phase (D) at the level of the second stage filter under anoxic conditions. For this purpose, the water is advantageously forced to percolate horizontally from the aerobic filter to the anaerobic filter through the gravel bed supporting the denitrifying fixed culture. Thus, it is possible to obtain nitrification in the aerobic filter, followed by denitrification in the filter in anaerobic, or anoxic.

The forced aeration system according to the invention is advantageously disposed on the bottom of the device under the second stage. It can then supply oxygen to the second stage and then, via the oxygen that rises to the surface, the first stage. Any system for injecting air in a controlled manner can be used. For example, it is possible to use a compressor or a blower or any other compression device. In a particular embodiment, the forced aeration system uses atmospheric oxygen. In order to ensure a good distribution of oxygen in the device, the forced ventilation system advantageously comprises a distribution network distributed over the entire surface of the bottom of the device. For example, the forced aeration system comprises a network of pipes pierced with oxygen-releasing orifices, the said network extending on the bottom.

In a particular implementation, the bottom of the device comprises one or more draining layers, of particle size for example between 10 and 30 mm. The network of oxygen supply pipes can then be arranged under this draining layer. In another embodiment, no draining layer is provided, the drainage being achieved through the particulate material of the second stage, the grain size is then selected to allow said drainage. In a first embodiment, a treated water drain network is disposed at the base of the second stage filter, or bottom of the device, for the phase (C) for discharging the treated water, out of the treatment device. In another particular implementation, the treated water is recovered by means of a recovery drain situated opposite the in-use filter (at the bottom and at the filter end) perpendicular to the direction of flow in the horizontal filter. It is thus possible to obtain, within the same filter of the second stage, a vertical flow from the first stage and a horizontal flow in the direction of the zone of the filter in which the collecting system is located.

In a particular embodiment, the device according to the invention comprises two series of filters in parallel, designed to operate alternately. In other words, the first stage and the second stage each comprise two or more filters in parallel. In this case, it may be advantageous to provide two collection systems, arranged on both sides of the device, so as to allow the evacuation of water in two different places. Thus, by playing on the collection systems, it is possible to allow vertical and/or horizontal flow within the second stage. In particular, it is possible to obtain a vertical flow in a first filter of the second stage, and forcing the evacuation (C) by the collection system located on the opposite side to the first filter, to obtain a horizontal flow in a second filter. By also playing on the aeration of the filters, it is possible to maintain the filter undergoing the vertical flow aerobic and the filter undergoing the horizontal flow in anoxia. Thus, nitrification occurs in the aerobic filter, undergoes denitrification in the anoxic filter. Thus, within the same treatment device, a high mineralization of the sludge, a biological degradation of the materials, or dissolved pollutions, and a treatment of the global nitrogen (that is to say a nitrification and a denitrification).

The device according to the invention can also be used in a similar way for the mineralization of sludge, whether primary or secondary. The invention therefore also a subject of a sludge mineralization process, implementing the wastewater purification device according to the invention, wherein the first stage is supplied with raw wastewater and/or sludge, said process comprising a phase (A) mineralization of sludge/organic deposits accumulating on the surface of the first floor; a phase (B) of aerobic degradation of dissolved pollution at the second stage; optionally a phase (D) of denitrification at the second stage; and a phase (C) of evacuation of treated.

The invention also relates to the use of a secondary or tertiary treatment device for wastewater comprising a horizontal flow stage intended to receive an effluent to be treated and a forced ventilation system preferably extending under said stage to for the at least partial elimination of pathogenic germs in said effluent.

Figure 2:
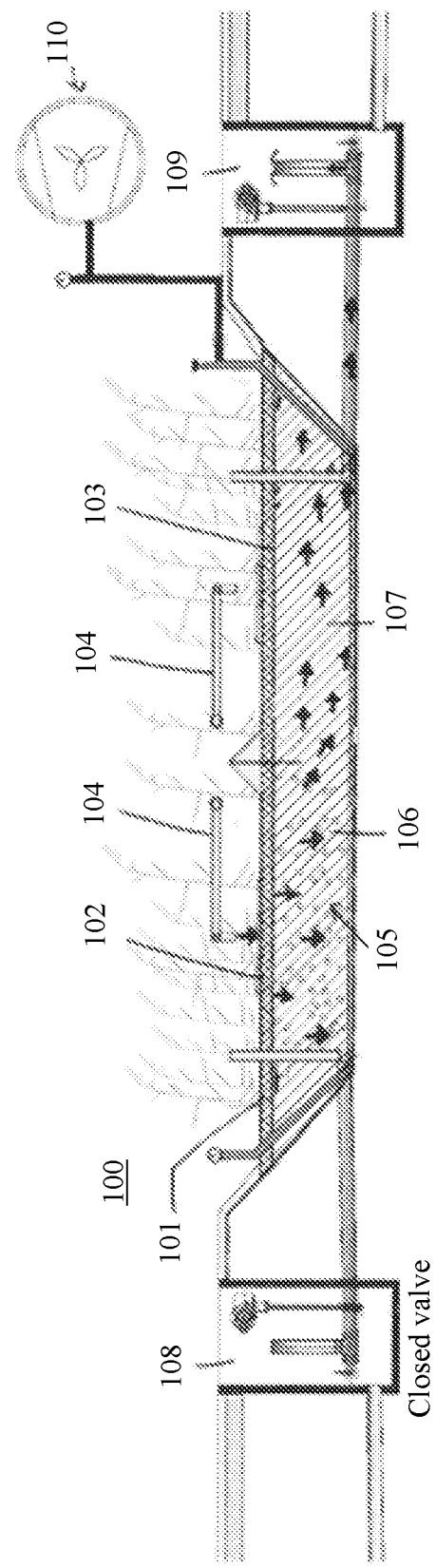
Figure 3:
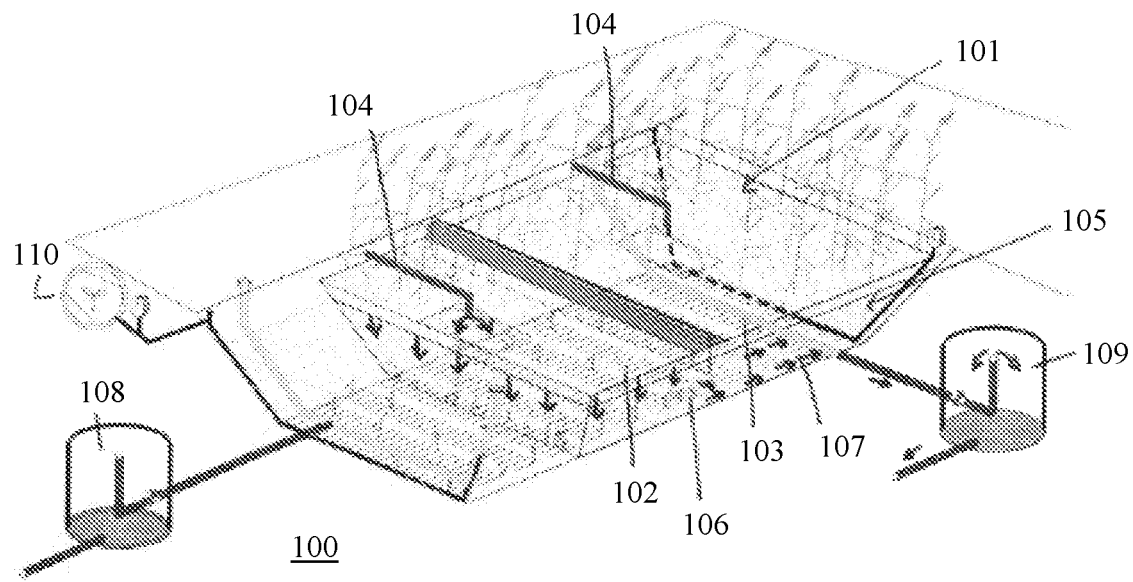
Figure 4:
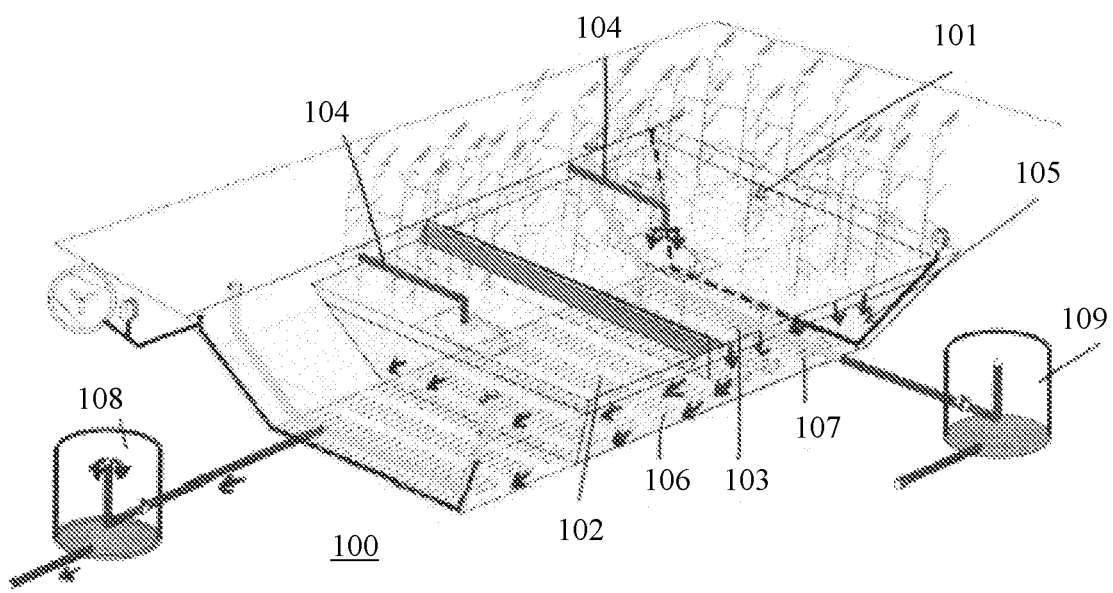

The invention will be better understood on reading the description which follows and on examining the figures that accompany it. These are presented for illustrative purposes and in no way limit the invention. The figures represent:

FIG. 1: A schematic representation in longitudinal section of a device for wastewater treatment according to an exemplary embodiment of the invention;

FIG. 2: A schematic representation in longitudinal section of a device for wastewater treatment according to another embodiment of the invention;

FIGS. 3 and 4: Two schematic representations of the water treatment device according to FIG. 2, operating in alternating mode.

A first embodiment of the device according to the invention is shown in FIG. 1, which comprises at least two filters in parallel. The configuration of the device thus shown does not allow denitrification, but only nitrification.

The water treatment device 10 comprises, more precisely, a first stage 11, each of the filters 12, 13 of which can be fed by tarpaulin by means of a feed 14 of raw wastewater. The surface of the first stage 11, planted with reeds, retains/filters the suspended matter contributing to the formation of the sludge layer and whose mechanical action of the plants allows the permeability. The first stage also comprises, under the reeds, a particulate filtering material. Directly under the particulate filter material of the first stage the particulate filter material of the second stage 15 extends. The second stage 15 is saturated with water: a loading gauge 16 makes it possible to maintain the water level.

A forced aeration system 17 makes it possible to inject oxygen into the treatment system 10. More specifically, the forced aeration system comprises a booster 18 and a network of pipes 19 extending into the bottom 20 of the water treatment device 10. For example, the pipe network 19 extends against the geomembrane covering the surface of the ground in which the device is implanted. The pipe network 19 is for example constituted by a plurality of pipes drilled in order to allow the air supplied by the booster 18 to be released. The pipes are for example spaced 5 to 20 cm apart to ensure a good distribution oxygen over the entire surface of the device. A drain 21 also extends into the bottom 20 of the device 10 for recovering the treated water and the drain to the outside of the device.

With such a treatment device 10, the screened wastewater arriving at one of the filters 12, 13 of the first stage 11 percolates vertically in said filter 12. The mineralization of the sludge accumulating on the surface of the first filter 12 of the first stage 11 is favored by the good oxygenation of the said filter 12. Indeed, the force ventilation system 17 makes it possible to increase the oxygenation of the filter 12 and thus optimizes mineralization of sludge. Furthermore, insofar as the second filter 13 is at rest, the sludge which has accumulated on the surface of the second filter 13 during a preceding feed phase may continue to mineralize and thus clogging is avoided.

After having percolated vertically in the filter 12 of the first stage 11, the water percolates vertically in a first filter 22 of the second stage 15, located under the first filter 12 of the first stage 11. The biological degradation which began in the filter 12 of the first stage 11 continues in the filter 22 of the second stage 15, including nitrification, favored by the large oxygenation of said filter by means of the forced aeration system 17.

The treated water is evacuated via the drain 21 extending on the bottom of the device 10 along the filters 22 and 23 of the second stage 15. A slope may be provided at the bottom 20 of the device 10 on either side of the drain 21, in order to avoid areas of stagnation.

FIGS. 2, 3 and 4 show a second embodiment of the device according to the invention, which also comprises two series of filters in parallel.

The water treatment device 100 also comprises a first stage 101, of which each of the filters 102, 103 can be supplied by tarpaulin by means of a feed 104 to the untreated wastewater. A second stage 105, saturated with water, is directly situated under the first stage 101. Two loading chambers 108, 109, each disposed at one end of a filter 106, 107 of the second stage 105, allow the water level to be maintained.

A forced ventilation system 110, capable of operating alternately, makes it possible to inject oxygen into the treatment device 100, from one and/or the other of the two filters 106, 107 of the second stage 105. For example, a valve system (not shown) alternately supplies oxygen to an array of pipes extending under the first filter 106 of the second stage 105 or a network of pipes extending under the second filter 107 of said second stage 105.

The loading ports 108, 109 also make it possible to collect the treated water. These collection systems can operate alternatively, in order to recover treated water from one or the other of said systems.

Device 100 may advantageously be used as described herein: A sheeting of crude raw effluent is poured onto the first filter 102 of the first stage 101 (FIGS. 2 and 3). The wastewater percolates vertically towards the first filter 106 of the second stage 105. Again, the mineralization of the sludge accumulating on the surface of the first filter 102 is promoted by the good oxygenation of the said filter 102. The second filter 103 of the first stage 101 is, on the other hand, at rest.

The forced aeration system 110 advantageously injects oxygen only at the level of the first filter 106 of the first stage. Thus, said first filter 106 is under aerobic conditions, while the second filter 107 is under anoxic conditions.

After percolating vertically in the filter 102 of the first stage 101, the waters percolate vertically in the first filter 106 of the second stage 105 located under the first filter 102 of the first stage 101. The conditions within the first filter 106 of the second stage 105 are combined to allow the treatment of dissolved pollutions including nitrification.

The collection system 109 opposite the first filter 106 of the second stage 105 is in operation, while the collection system 108 on the side of the first filter 106 does not operate (valve closed). Thus, to be evacuated, the treated water must pass through the second filter 107 of the second stage 105, in which they will percolate horizontally. The second filter 107 being in anoxic conditions, nitrification of the nitrates can then take place. A treatment of the overall nitrogen is thus obtained, leaving device 100.

During the next supply cycle (FIG. 4), the second filter 103 of the first stage 101 is supplied, the first filter 101 being put to rest. The forced aeration system 110 also changes the oxygen injection zone so that the first filter 106 of the second stage 105 is found under anoxic conditions, while the second stage 107 of the second stage 105 is in aerobic conditions. Similarly, the activated collection system is reversed. The treated water is evacuated by the system 108 opposite the second filter 107 so that the water which percolates vertically in the second filter 107 also percolates horizontally in the first filter 106 before being evacuated.

It is thus possible to alternate the cycles of active aeration phases and rest phases in the series of filters 102, 106 and 103, 107.

According to the invention, it is possible to provide more series of filters in parallel, for example three, four, etc., in particular so as to space the operating times of each of the filters.

The invention claimed is:

1. A sewage treatment device (10, 100) of the filtering solid type comprising
    a raw wastewater feed (14, 104) that delivers raw wastewater onto the surface of a first stage (11, 101);
    the first stage (11, 101) comprising with a freely drained fixed culture configured to allow unsaturated vertical flow of water such raw wastewater delivered by said raw wastewater feed flows through said first stage, said first stage comprising at least one planted filter;
    a second stage (15, 105) comprising a fixed culture saturated with water and configured to allow vertical and/or horizontal flow of water flowing from said first stage to said second stage, said second stage comprising at least one filter and said second stage being arranged directly below the first stage;
    a forced aeration system (17, 110) extending under the second stage, said forced aeration system being configured to supply oxygen to the second stage through a first pipe system (19); and
    a drain (21) configured to recover treated water and drain the treated water out of the sewage treatment device.

2. The sewage treatment device according to claim 1, wherein the second stage is configured to allow both vertical and horizontal flow.

3. The sewage treatment device according to claim 1, wherein the first stage has a thickness between 10 and 50 cm and/or the second stage has a thickness between 100 and 200 cm.

4. The sewage treatment device according to claim 1, wherein the first stage is a filter planted with macrophytes.

5. The sewage treatment device according to claim 1, wherein the forced aeration system operates continuously or discontinuously.

6. The sewage treatment device according to claim 1, said device comprising at least two series of filters (12, 22, 13, 23; 102, 106, 103, 107) for the first stage and the second stage, with said at least two series of filters being arranged in parallel and configured to operate alternately.

7. The sewage treatment device according to claim 6, comprising two treated effluent collection systems (108, 109) each arranged at a different filter of the second stage, said collection systems being configured to operate alternately.

8. The sewage treatment device according to claim 6, wherein the forced aeration system is configured to operate alternately and/or sequentially at one of the filters (106, 107) of the second stage, so as to alternate the aerobic and anoxic conditions in said filters.

9. The sewage treatment device according to claim 1, comprising a means to maintain the water level in the second stage for immersing the second stage in water.

10. The sewage treatment device according to claim 9, wherein the means to maintain the water level in the second stage partially immerses the second stage in water.

11. The sewage treatment device according to claim 9, wherein the means to maintain the water level in the second stage completely immerses the second stage in water.

12. The sewage treatment device according to claim 1, comprising a loading gauge or a loading chamber (16) that maintains the water level in the second stage for immersing the second stage in water.

13. The sewage treatment device according to claim 12, wherein the loading gauge or the loading chamber (16) maintains the water level in the second stage such that the second stage is partially immersed in water.

14. The sewage treatment device according to claim 12, wherein the loading gauge or the loading chamber (16) maintains the water level in the second stage such that the second stage is completely immersed in water.

15. The sewage treatment device according to claim 12, wherein the loading gauge or loading chamber (16) that maintains the water level in the second stage for immersing the second stage is configured to allow flow of water through the second stage, exiting via the drain (21) while maintaining second stage immersion at a fixed water level.

16. The sewage treatment device according to claim 15, wherein the loading gauge or loading chamber (16) is adjustable to allow the water level to be set at different elevations.

17. The sewage treatment device according to claim 1, wherein the loading gauge or loading chamber (16) is configured to maintain the water level in the second stage such that the second stage is partially immersed in water or completely immersed in water.

18. The sewage treatment device according to claim 1, said first pipe system comprising a network of pipes configured to supply oxygen to the second stage.

19. The sewage treatment device according to claim 1, said first pipe system comprising an array of pipes configured to supply oxygen to the second stage.

20. The sewage treatment device according to claim 1, wherein said drain is a drain network disposed at the base of the second stage filter of said device.

21. The sewage treatment device according to claim 1, wherein said drain extends into the bottom of said device to drain treated water outside of said device for the recovery of treated water.

22. A process for treating wastewater comprising feeding the first stage of the sewage treatment device according to claim 1 with raw effluent, the process comprising a phase (A) of mineralization of sludge accumulating on the surface of the first stage; a phase (B) of aerobic degradation of pollution dissolved at the second stage that is saturated with water; and a phase (C) for evacuating the treated water.

23. The process according to claim 22, comprising operating the forced aeration system alternatively or sequentially, so as to alternate the aerobic and anoxic conditions within the second stage, said process further comprising a phase (D) of denitrification of the nitrates at the second stage under anoxic conditions before the evacuation phase (C).

24. The process according to claim 22, wherein the aerobic degradation phase (B) of the dissolved pollution at the second saturated and aerated stage is accompanied by at least partial removal of the pathogenic germs present in the effluent.

25. The process according to claim 22, wherein the sewage treatment device comprises at least two series of filters for the first stage and the second stage, with at least two series of filters being arranged in parallel, wherein when a second stage filter is supplied with oxygen by the forced aeration system, another filter of the second stage is not supplied to create anoxic conditions, and vice versa, said method comprising a denitrification phase (D) at the second stage filter under anoxic conditions.

26. The process according to claim 25, wherein the second stage is provided with two systems for collecting the treated effluent each disposed at a different filter of said second stage, and wherein the phase (C) is discharged through the collection system located at a resting filter, so that water flows vertically from the first stage of the filter being dosed into the second stage, then horizontally into the second stage of the resting filter, before being evacuated.

27. A method of mineralization of sludge, said method comprising a phase (A) of feeding the sewage treatment device according to claim 1 with wastewater and forming a sludge and mineralization of the sludge accumulating on the surface of the first stage; a phase (B) of aerobic degradation of dissolved pollution at the second stage that is saturated with water; optionally a nitrate denitrification phase (D) in the second stage; and a phase (C) for discharging the treated wastewater.

* * * * *